G. S. SCHUNK.
MOTOR ATTACHMENT FOR BICYLES.
APPLICATION FILED FEB. 18, 1915.
1,158,311.
Patented Oct. 26, 1915.
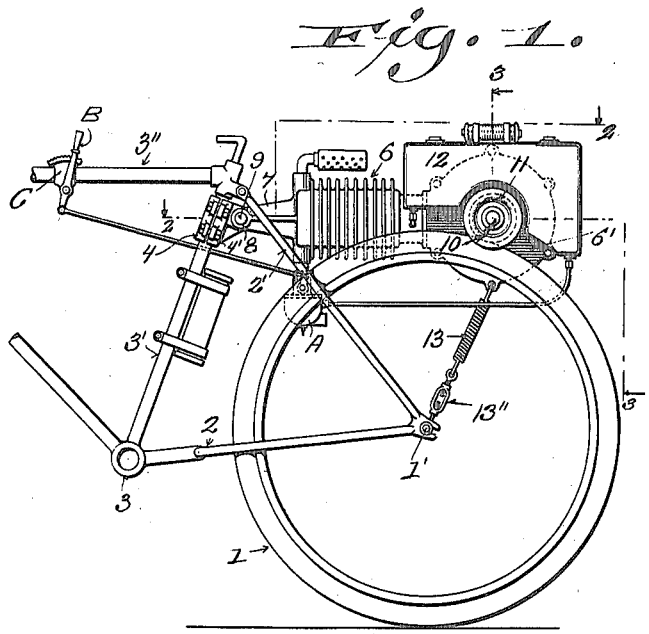
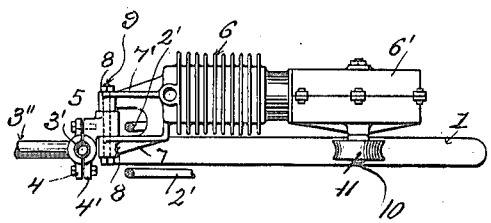
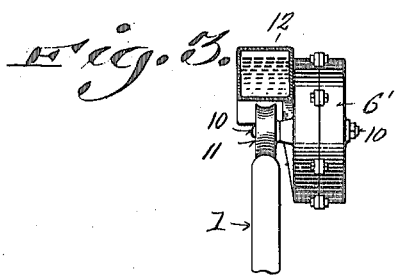

UNITED STATES PATENT OFFICE.

GEORGE S. SCHUNK, OF WEST ALLIS, WISCONSIN.

MOTOR ATTACHMENT FOR BICYCLES.

1,158,311.  Specification of Letters Patent.  Patented Oct. 26, 1915.

Application filed February 18, 1915. Serial No. 9,011.

*To all whom it may concern:*

Be it known that I, GEORGE S. SCHUNK, a citizen of the United States, and resident of West Allis, in the county of Milwaukee and State of Wisconsin, have invented certain new and useful Improvements in Motor Attachments for Bicycles; and I do hereby declare that the following is a full, clear, and exact description thereof.

My invention has for its object to provide a simple, economical and effective motor attachment for bicycles, wherein the same may be quickly converted into self-propelled vehicles without cutting or fitting that would require the services of a skilled mechanic.

With the above objects in view the invention consists in what is herein shown, described and claimed.

In the drawings Figure 1 represents a fragmentary side elevation of a bicycle having attached thereto a motor in accordance with my invention; Fig. 2, a sectional plan view of the same, the section being indicated by line 2—2 of Fig. 1, and Fig. 3, a detailed cross-section of a motor and its driving connection with the rear wheel of a bicycle, the section being indicated by line 3—3 of Fig. 1.

Referring by characters to the drawings, 1 represents the usual rear drive wheel of a bicycle, which wheel is supported upon an axle 1' that is mounted in a cluster formed by lower and upper rear fork members 2, 2', respectively. The lower fork member is connected to the crank-hanger 3 of the frame, from which also extends the usual seat-mast 3'. The upper portion of the seat-mast serves as a point of connection for the fork member 2' and a reach-bar 3" of the frame. Secured to the mast is a two-part clip member 4, 4' the member 4' being provided with a centrally apertured hub 5. The said clip members are secured together by clamp bolts, as shown, whereby the parts can be readily attached or detached.

6 indicates the cylinder of a motor casing and the outer end of said cylinder has extending therefrom spaced ears 7, 7', which are formed with alined apertured end hubs 8 that are adapted to register with the clip hub 5. The bolt 9 is fitted through the several hubs whereby a pivot joint is effected between the motor casing and vehicle frame. The rear crank housing 6' of the casing has mounted therein the usual motor shaft 10 carrying a friction driving pulley 11, which pulley is adapted to be held in driving contact with the tread of the drive-wheel 1 by the weight of the motor, which is in pivotal connection, as stated, with the frame, and thus is capable of floating at its free end to compensate for variations in the tread of the drive-wheel and to facilitate a positive smooth driving connection between the friction wheel 11 and the said rear drive-wheel of the vehicle.

In this exemplification of my invention the fuel tank 12 is shown attached to the motor casing and arranged to overhang the drive wheel of the vehicle, but it is understood that I may, without departing from the spirit of my invention, attach the tank to any suitable part of the vehicle frame, if desired. However, by connecting it as mentioned, the weight of a fuel supply serves to add frictional resistance between the drive and driven members, whereby the power is rendered more positive.

The motor is equipped with the usual carbureter A, which is under control of a lever B, the same being mounted upon a bracket C, which is secured in any suitable manner to the reach-bar of the vehicle-frame.

In some instances I may, as shown, employ a yielding tie connection between the folding end of the motor casing and frame, whereby the friction drive-wheel is positively held in contact with the drive-wheel of the vehicle. The means employed for accomplishing this result embodies a coiled spring 13, which is connected to the crank casing 6' of the motor and the axle 1' of the drive-wheel 1 by a shackle connection and turnbuckle 13, the said turnbuckle being provided for adjusting the tension of the tie device. Thus the motor is held from inadvertent rebound under rough road conditions, whereby driving connection between the same and the rear wheel of the vehicle is insured at all times.

While I have shown and described a simple form of detachably connecting a motor to a foot-propelled vehicle of the character described, it is obvious that I may, without departing from the spirit of my invention, connect the motor in any floating manner within the knowledge of skilled mechanics to form a frictional driving connection between a wheel carried by the motor and the rear drive-wheel of the vehicle.

I claim:

1. In a bicycle having a rear drive-wheel and a frame; the combination of a motor having its cylinder end in pivotal union with the frame, the crank-shaft end of said motor being adapted to float, a crank-shaft extending through the motor-casing, a driving wheel carried by the crank-shaft adapted to engage the tread of the vehicle wheel and a spring-tension connection between the floating end of the motor casing and bicycle frame.

2. In a bicycle having a rear drive-wheel and a frame; the combination of a motor having its cylinder end in pivotal union with the bicycle frame, the crank-shaft end of said motor being adapted to float, a crank-shaft extending through the motor casing having a wheel mounted thereon engageable with the tread of the drive-wheel, a spring tension connection between the floating end of the motor casing and bicycle frame, and means for adjusting the tension of said spring.

In testimony that I claim the foregoing I have hereunto set my hand at Milwaukee in the county of Milwaukee and State of Wisconsin in the presence of two witnesses.

GEORGE S. SCHUNK.

Witnesses:
GEO. W. YOUNG,
M. E. DOWNEY.